US008271574B1

(12) United States Patent
Srinivasan et al.

(10) Patent No.: US 8,271,574 B1
(45) Date of Patent: Sep. 18, 2012

(54) CONTENT SHARING AND COLLABORATION

(75) Inventors: Karamadai Srinivasan, Rocklin, CA (US); Rajpal Gill, Rocklin, CA (US); Thomas Tripp, El Dorado Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1283 days.

(21) Appl. No.: 11/019,867

(22) Filed: Dec. 22, 2004

(51) Int. Cl.
*G06F 15/16* (2006.01)
*G06F 17/00* (2006.01)

(52) U.S. Cl. .................... 709/201; 709/204; 715/203

(58) Field of Classification Search .......... 709/201, 709/205
See application file for complete search history.

(56) References Cited

U.S. PATENT DOCUMENTS

| | | | | |
|---|---|---|---|---|
| 6,230,171 B1* | 5/2001 | Pacifici et al. | ............. | 715/201 |
| 6,240,444 B1* | 5/2001 | Fin et al. | ............. | 709/205 |
| 6,697,824 B1* | 2/2004 | Bowman-Amuah | ............. | 709/229 |
| 6,904,449 B1* | 6/2005 | Quinones | ............. | 709/203 |
| 6,990,513 B2* | 1/2006 | Belfiore et al. | ............. | 709/203 |
| 7,003,550 B1* | 2/2006 | Cleasby et al. | ............. | 709/205 |
| 7,010,571 B1* | 3/2006 | Quatrano et al. | ............. | 709/205 |
| 7,124,355 B1* | 10/2006 | Kukkal | ............. | 715/234 |
| 7,149,776 B1* | 12/2006 | Roy et al. | ............. | 709/205 |
| 7,254,608 B2* | 8/2007 | Yeager et al. | ............. | 709/203 |
| 7,287,158 B2* | 10/2007 | Futamura et al. | ............. | 713/156 |
| 7,310,675 B2* | 12/2007 | Salesky et al. | ............. | 709/227 |
| 7,353,252 B1* | 4/2008 | Yang et al. | ............. | 709/204 |
| 7,370,269 B1* | 5/2008 | Prabhu et al. | ............. | 715/230 |
| 7,409,700 B1* | 8/2008 | Watson | ............. | 725/51 |
| 7,627,658 B2* | 12/2009 | Levett et al. | ............. | 709/223 |
| 2002/0013832 A1* | 1/2002 | Hubbard | ............. | 709/220 |
| 2002/0087496 A1* | 7/2002 | Stirpe et al. | ............. | 706/45 |
| 2002/0138624 A1* | 9/2002 | Esenther | ............. | 709/227 |
| 2003/0028451 A1* | 2/2003 | Ananian | ............. | 705/27 |
| 2003/0041108 A1* | 2/2003 | Henrick et al. | ............. | 709/205 |
| 2003/0105812 A1* | 6/2003 | Flowers et al. | ............. | 709/203 |
| 2003/0156591 A1* | 8/2003 | Sorsa | ............. | 370/401 |
| 2004/0010682 A1* | 1/2004 | Foster et al. | ............. | 713/156 |
| 2004/0148375 A1* | 7/2004 | Levett et al. | ............. | 709/223 |
| 2004/0225716 A1* | 11/2004 | Shamir et al. | ............. | 709/204 |
| 2005/0044197 A1* | 2/2005 | Lai | ............. | 709/223 |
| 2006/0041503 A1* | 2/2006 | Blair et al. | ............. | 705/37 |
| 2006/0048216 A1* | 3/2006 | Hinton et al. | ............. | 726/8 |
| 2007/0118389 A1* | 5/2007 | Shipon | ............. | 705/1 |

* cited by examiner

*Primary Examiner* — Ranodhi Serrao
*Assistant Examiner* — Muktesh G Gupta

(57) ABSTRACT

A content sharing and collaborative computing environment is provided. In an illustrative implementation, the content sharing and collaboration environment comprises a computing environment capable of cooperating with at least one computing application operating on a cooperating computing environment, and a content sharing computing application residing on the computing environment alone to provide access to one or more cooperating computing environments to content for sharing.

13 Claims, 7 Drawing Sheets

CONTENT SHARING AND COLLABORATION

The electronic exchange of information is ubiquitous in daily communication. From simple electronic mail, to text messaging, to complex virtual content sharing and collaboration, electronic exchange of information is pervasive and integrated within everyday rituals. There are numerous communications protocols and architectures that are used when realizing the electronic exchange of information. The commonality among these protocols and communications architectures is the communication of information from an origination point to a destination through a communications network. The communications network can be a single network or a cluster of communications networks cooperating to communicate electronic information over vast geographic regions. These networks can be wireless and/or land based (wired) communications networks that can operate to service large numbers of simultaneous users. The Internet is an example of a large cluster of communications networks operating on selected communication protocols. Given the reach of the Internet, oceans, mountains, and large land masses can be very quickly traversed to realize electronic exchange of information.

Enterprises employ both public (e.g., the Internet) and private (e.g., local area networks and wide area networks) communications networks to electronically exchange data between members of the enterprise. The electronic exchange of information facilitates communication between cooperating members and allow for collaboration on enterprise matters regardless of geographic proximity. Similarly, electronic exchange of information allows for collaboration in a non-enterprise environment. In either context, cooperating parties can electronically exchange information using a number of computing applications employing various communications protocols and architectures. Examples of such computing applications, communications protocols, and architectures include but are not limited to electronic mail computing applications (e.g., operating in a computing environment that uses one or more communications networks) exchanging information using the simple mail transfer protocol (SMTP), content navigation and browsing applications exchanging information using the hyper text transfer protocol (HTTP), and instant messaging computing applications. These computing applications can be used alone, or in combination, to allow for real-time online exchange of information and collaboration of information.

In the context of electronic collaboration of information, such practice can be critical to the success of organizations and enterprises, and important to individuals desiring to collaborate with cooperating parties to share, navigate, modify, and manipulate information in real time. There are a number of collaborative computing applications that can be used to perform one or more of these functions. Current collaborative computing applications contain a server side computing application component and a client side computing application component. In operation, when participating users use a collaborative computing application, a request can be made to the server side collaborative computing application to initiate a collaborative session (e.g., over the Internet). Responsive to such requests, the server side collaborative computing application cooperates with the client computing environments of the participating users and loads a client side collaborative computing application component (e.g., an applet for operation on a client side web browser computing application) so that the client computing environments can communicate and cooperate with the server side collaborative computing application to share and/or collaborate content between participating users. Other practices are not as robust requiring the participating users to have installed (i.e., not by a server side collaborative computing application) on their client computing environments a specific client side collaborative computing application for use when sharing and/or collaborating content.

However, current practices are cumbersome and not robust since a client side collaborative computing application component (e.g., either dynamically loaded or pre-installed) is required so that the server side collaborative computing application can share and/or collaborate content.

BRIEF DESCRIPTION OF THE DRAWINGS

The content sharing systems and methods are further described with reference to the accompanying drawings in which.

DETAILED DESCRIPTION

Figure 1:
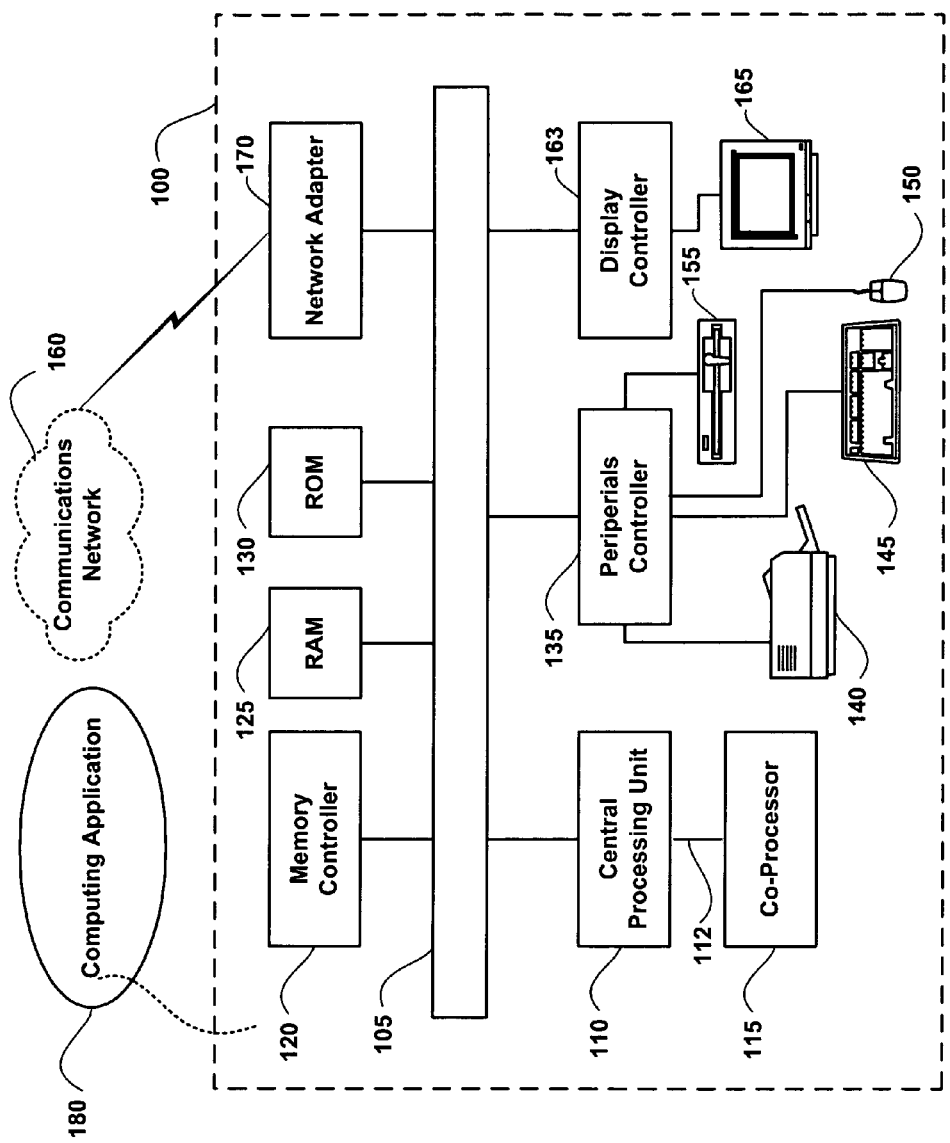
FIG. 1 is a block diagram of an exemplary computing environment in accordance with an implementation of the herein described systems and methods.

Overview:

The electronic exchange of information has become common place and is part of everyday rituals. From simple electronic mail to complex multi-location and multi-party content collaboration, the electronic exchange of information can be used to communicate information between parties in real time and, in some applications, in a collaborative manner. In the context of collaborative content exchange, a participating user can use one or more collaborative computing applications to establish a real-time content sharing and/or collaboration session over a selected communications network. Current conventions allow users operating a client computing environment (e.g., a web browser computing application) to cooperate with a collaborative computing application operating on a server computing environment through a communications network. With such conventions, the server-side collaborative computing application can cooperate with the participating client-side computing applications to load a client-side collaborative computing application component (e.g., JAVA® applet, DirectX® applet, etc.) to allow the client-side computing application to engage in a content sharing and/or collaboration session.

The collaborative computing application component is typically dependent on the client computing environment operating configuration (e.g., dependent on a client computer's operating system) and requires that the client computing environment maintain certain configuration parameters and/or client computing environment components (e.g., a web browser supporting the operation of JAVA applets, a web browser or other computing application supporting the operation of DirectX modules, etc.). In another implementation, instead of dynamically loading a client-side collaborative computing application component, current conventions can require that cooperating client computing environments have pre-loaded one or more client-side collaborative computing applications dedicated to perform a content sharing and/or collaboration session.

The herein described systems and methods aim to ameliorate the shortcomings of existing practices by providing a server side only, zero-footprint (e.g., the server side only environment does not install, load, or execute a computing application and/or applet on a cooperating computing environment—e.g., client computing environment), robust, platform independent, and computing environment independent content sharing and/or collaboration environment. In an illustrative implementation, an exemplary server computing environment comprises a server collaborative computing application. In the illustrative implementation, the server collaborative computing application operates to cooperate with existing client computing environment content viewing and/or browsing computing applications (e.g., a web browser computing application) to establish content sharing and/or collaborative sessions. Participating users can employ the herein described systems and methods to share and/or collaborate content with each other using client computing environments cooperating with the illustrative server computing environment over an exemplary communications network.

In an illustrative operation, the server collaborative computing application receives a request from a cooperating client computing application to establish a content sharing and/or collaboration session. Included in the request for a content sharing and/or collaboration session can be a pointer to the content that is desired to be shared and/or collaborated. Responsive to the request for content sharing and/or collaboration session, the server collaborative computing application generates a unique identification (ID) which it communicates to the requesting client computing application. The server collaborative computing application can also associate the generated ID can with the received pointer that can point to the desired content to be shared and/or collaborated. The requesting client computing application can then cooperate with another participating user operating another client computing application over an exemplary communications network to communicate the unique generated ID. When sharing content and/or collaborating on content the participating users can communicate with the server collaborative computing application to communicate the generated unique ID. With all the cooperating client computing applications in cooperation with the server collaborative computing application (e.g., by logging on through the use of the generated unique ID), the server collaborative computing application can operate to broadcast (e.g., as part of a content sharing and/or collaboration session) between the cooperating client computing applications content and operations performed on the content by any of the cooperating client computing including, but not limited to, content navigation, content manipulation, and content editing.

Additionally, the exemplary server collaborative computing application can operate to poll the cooperating client computing applications, as part of an established session, for new content which is desired to be shared and/or collaborated. In this context, the exemplary server collaborative computing application can cooperate with other computing environments to retrieve such desired content and broadcast (e.g., for sharing and/or collaboration) the retrieved content as part of the established session.

Illustrative Computing Environment

FIG. 1 depicts an exemplary computing system 100 in accordance with herein described system and methods. The computing system 100 is capable of executing a variety of computing applications 180. Computing application 180 can comprise a computing application, a computing applet, a computing program and other instruction set operative on computing system 100 to perform at least one function, operation, and/or procedure. Exemplary computing system 100 is controlled primarily by computer readable instructions, which may be in the form of software. The computer readable instructions can contain instructions for computing system 100 for storing and accessing the computer readable instructions themselves. Such software may be executed within central processing unit (CPU) 110 to cause the computing system 100 to do work. In many known computer servers, workstations and personal computers CPU 110 is implemented by micro-electronic chips CPUs called microprocessors. A coprocessor 115 is an optional processor, distinct from the main CPU 110, that performs additional functions or assists the CPU 110. The CPU 110 may be connected to co-processor 115 through interconnect 112. One common type of coprocessor is the floating-point coprocessor, also called a numeric or math coprocessor, which is designed to perform numeric calculations faster and better than the general-purpose CPU 110.

It is appreciated that although an illustrative computing environment is shown to comprise the single CPU 110 that such description is merely illustrative as computing environment 100 may comprise a number of CPUs 110. Additionally computing environment 100 may exploit the resources of remote CPUs (not shown) through communications network 160 or some other data communications means (not shown).

In operation, the CPU 110 fetches, decodes, and executes instructions, and transfers information to and from other resources via the computer's main data-transfer path, system bus 105. Such a system bus connects the components in the computing system 100 and defines the medium for data exchange. The system bus 105 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 110. Devices that attach to these busses and arbitrate to take over the bus are called bus masters. Bus master support also allows multiprocessor configurations of the busses to be created by the addition of bus master adapters containing a processor and its support chips.

Memory devices coupled to the system bus 105 include random access memory (RAM) 125 and read only memory (ROM) 130. Such memories include circuitry that allows information to be stored and retrieved. The ROM 130 generally contain stored data that cannot be modified. Data stored in the RAM 125 can be read or changed by CPU 110 or other hardware devices. Access to the RAM 125 and/or ROM 130 may be controlled by memory controller 120. The memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process's virtual address space unless memory sharing between the processes has been set up.

In addition, the computing system 100 may contain peripherals controller 135 responsible for communicating instructions from the CPU 110 to peripherals, such as, printer 140, keyboard 145, mouse 150, and data storage drive 155.

Display 165, which is controlled by a display controller 163, is used to display visual output generated by the computing system 100. Such visual output may include text, graphics, animated graphics, and video. The display 165 may be implemented with a CRT-based video display, an LCD-based flat-panel display, gas plasma-based flat-panel display, a touch-panel, or other display forms. The display controller 163 includes electronic components required to generate a video signal that is sent to display 165.

Further, the computing system 100 may contain network adaptor 170 which may be used to connect the computing system 100 to an external communication network 160. The communications network 160 may provide computer users with connections for communicating and transferring software and information electronically. Additionally, communications network 160 may provide distributed processing, which involves several computers and the sharing of workloads or cooperative efforts in performing a task. It will be appreciated that the network connections shown are exemplary and other means of establishing a communications link between the computers may be used.

It is appreciated that the exemplary computer system 100 is merely illustrative of a computing environment in which the herein described systems and methods may operate and does not limit the implementation of the herein described systems and methods in computing environments having differing components and configurations as the inventive concepts described herein may be implemented in various computing environments having various components and configurations.

Figure 2:
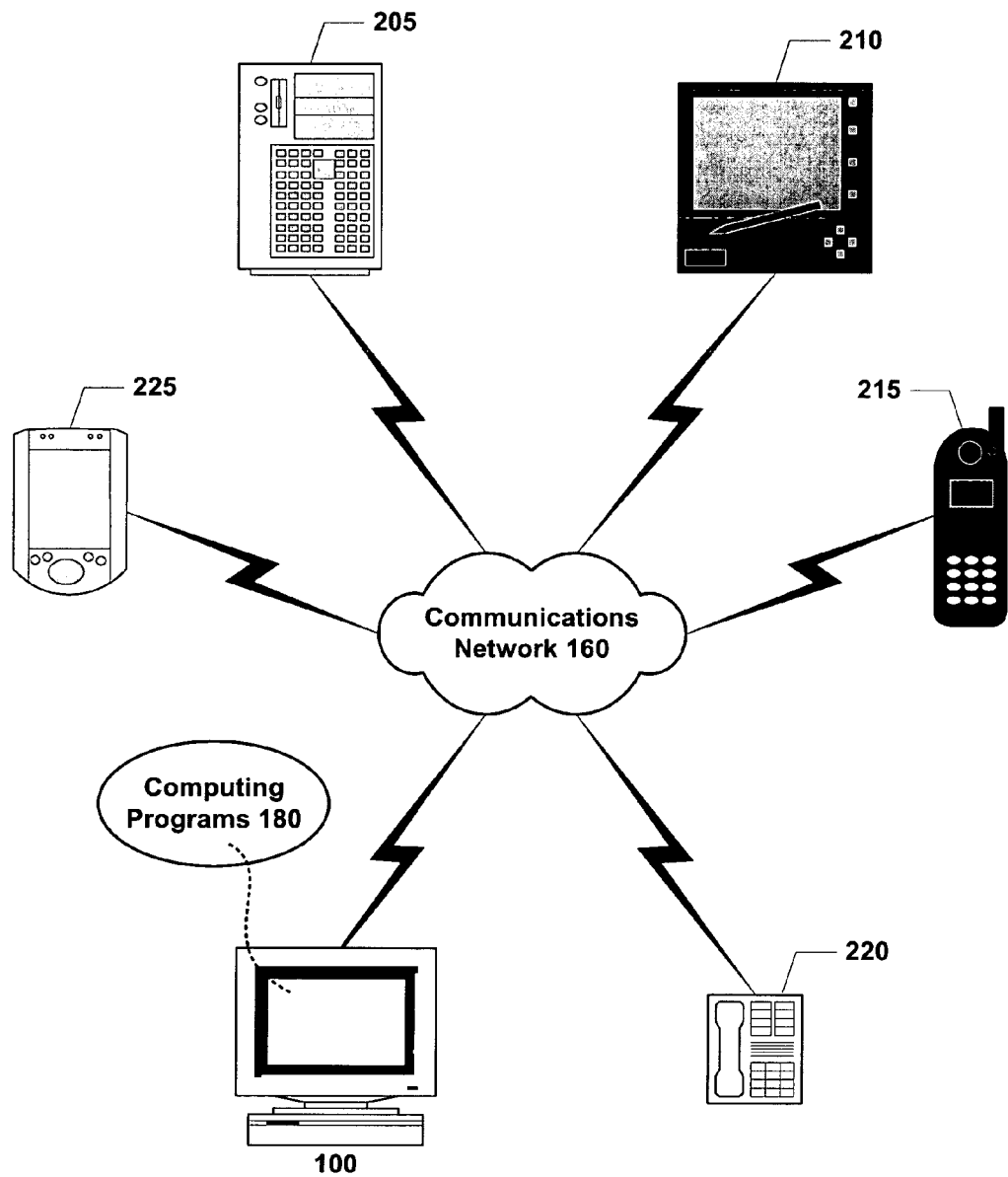
FIG. 2 is a block diagram showing the cooperation of exemplary components of an exemplary data communications architecture.

Illustrative Computer Network Environment:

Computing system 100, described above, can be deployed as part of a computer network. In general, the above description for computing environments applies to both server computers and client computers deployed in a network environment. FIG. 2 illustrates an exemplary illustrative networked computing environment 200, with a server in communication -with client computers via a communications network, in which the herein described apparatus and methods may be employed. As shown in FIG. 2, server 205 may be interconnected via a communications network 160 (which may be either of, or a combination of a fixed-wire or wireless LAN, WAN, intranet, extranet, peer-to-peer network, the Internet, or other communications network) with a number of client computing environments such as tablet personal computer 210, mobile telephone 215, telephone 220, personal computer 100, and personal digital assistance 225. In a network environment in which the communications network 160 is the Internet, for example, server 205 can be dedicated computing environment servers operable to process and communicate data to and from client computing environments 100, 210, 215, 220, and 225 via any of a number of known protocols, such as, hypertext transfer protocol (HTTP), file transfer protocol (FTP), simple object access protocol (SOAP), or wireless application protocol (WAP). Each client computing environment 100, 210, 215, 220, and 225 can be equipped with browser operating system 180 operable to support one or more computing applications such as a web browser (not shown), or a mobile desktop environment (not shown) to gain access to server computing environment 205.

In operation, a user (not shown) may interact with a computing application running on a client computing environments to obtain desired data and/or computing applications. The data and/or computing applications may be stored on server computing environment 205 and communicated to cooperating users through client computing environments 100, 210, 215, 220, and 225, over exemplary communications network 160. A participating user may request access to specific data and applications housed in whole or in part on server computing environment 205. These data may be communicated between client computing environments 100, 210, 215, 220, and 220 and server computing environments for processing and storage. Server computing environment 205 may host computing applications, processes and applets for the generation, authentication, encryption, and communication of web services and may cooperate with other server computing environments (not shown), third party service providers (not shown), network attached storage (NAS) and storage area networks (SAN) to realize such web services transactions.

Content Sharing Simulation:

A content sharing and collaborative computing environment is provided. In an illustrative implementation, a zero-footprint content sharing and collaboration architecture comprises a server computing environment operating an illustrative content sharing and collaboration computing application (CSCCA). The CSCCA comprises a unique identification generator and a content agent operable to manage, translate, and deliver content for sharing and collaboration between two or more cooperating parties. In operation, a first operator (e.g., the collaborator) can communicate with the CSCCA to obtain a unique identification. The unique identification can then be communicated to a second operator (e.g., a collaboratee) so that the second operator can communicate with CSCCA to obtain access to the content being shared and collaborated. Real time collaboration can occur between the collaborator and collaborate when the first and second operator are in communication with the CSCCA at the same time.

Figure 3:
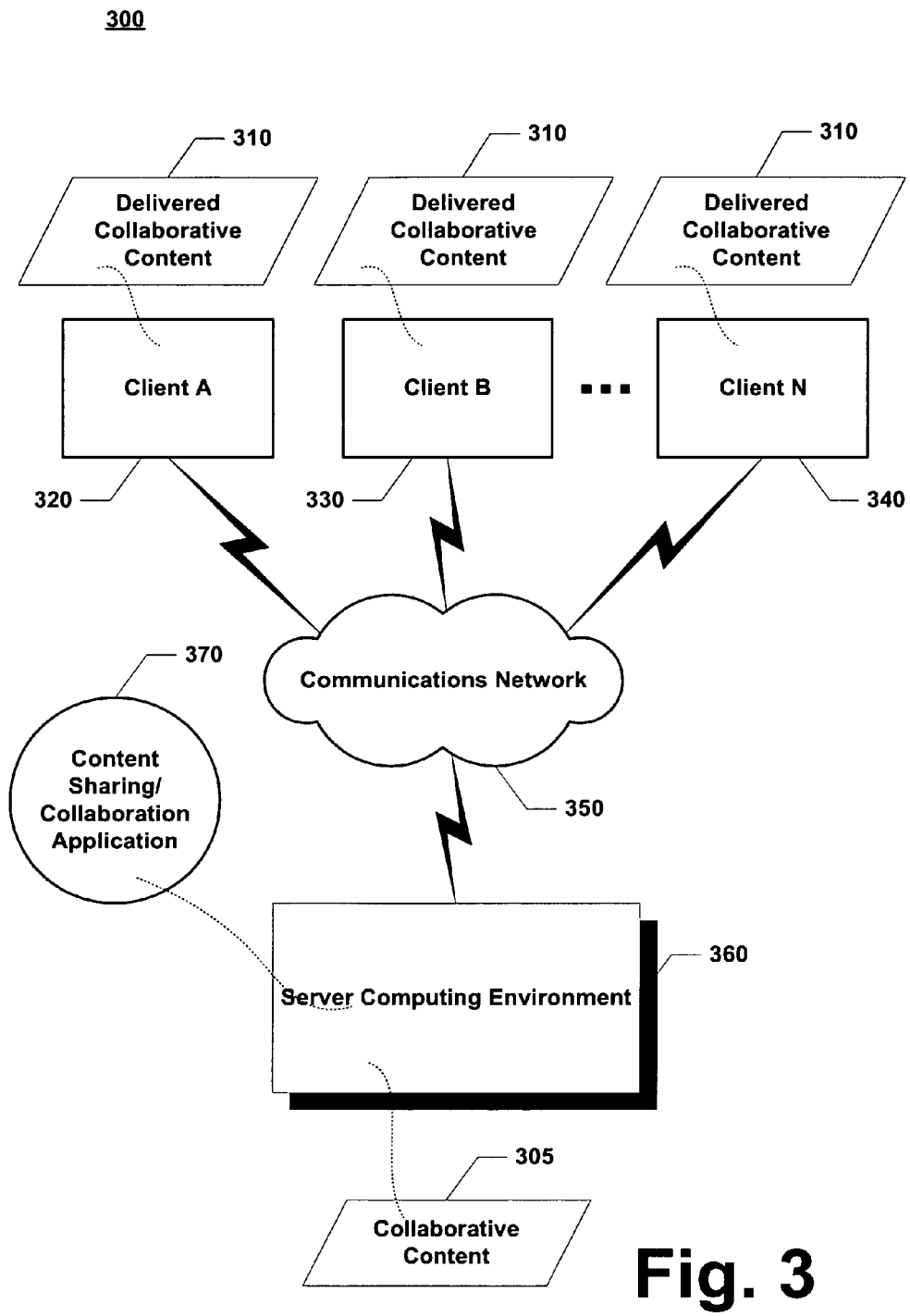
FIG. 3 is a block diagram showing an illustrative configuration of an exemplary content sharing and collaboration computing environment.

FIG. 3 shows exemplary content sharing and collaboration computing environment 300. As is shown, in an illustrative implementation, exemplary content sharing and collaboration computing environment 300 can comprise a number of client computing environments (e.g., Client A 320, Client B, up to Client N 340) that can operate to process and display delivered collaborative content 310 that can be received from communications network 350. Additionally, in this illustrative implementation, exemplary content sharing and collaboration computing environment can comprise server computing environment 360 that can operate content sharing/collaboration computing application 370 and can operate to process collaborative content 305.

In an illustrative operation, one or more client computing environments (e.g., Client A 320, Client B 330, up to Client N 340), can communicate a request for a collaborative content session to content sharing/collaboration computing application 370 operating on server computing environment 360 over communications network 350. Responsive to the request for a collaborative content session, content sharing/collaboration computing application 370 can generate a session in which one or more of cooperating client computing environments (e.g., Client A 320, Client B 330, up to Client N 340) can participate in the generated session to share and collaborate content. When generating the session, the content sharing/collaboration application does not cooperate with the one or more participating client computing environments (e.g., Client A 320, Client B 330, up to Client N 340) to load and/or execute any client based computing application. Rather, in the illustrative implementation, content sharing/collaboration computing application 370 can operate to generate a unique identification tag which can be used by one or more cooperating client computing environments (e.g., Client A 320, Client B 330, up to Client N 340) to participate in a collaborative session. When conducting a content sharing/collaboration session, content sharing/collaboration computing application 370 can operate to process collaborative content 305 and communicate processed collaborative content 305 to one or more participating client computing environments over communications network 350. One or more of participating client computing environments (e.g., Client A 320, Client B 330, up to Client N 340) can operate to receive collaborative content 305 as delivered collaborative content 310 for display, manipulation, and navigation.

Figure 4:
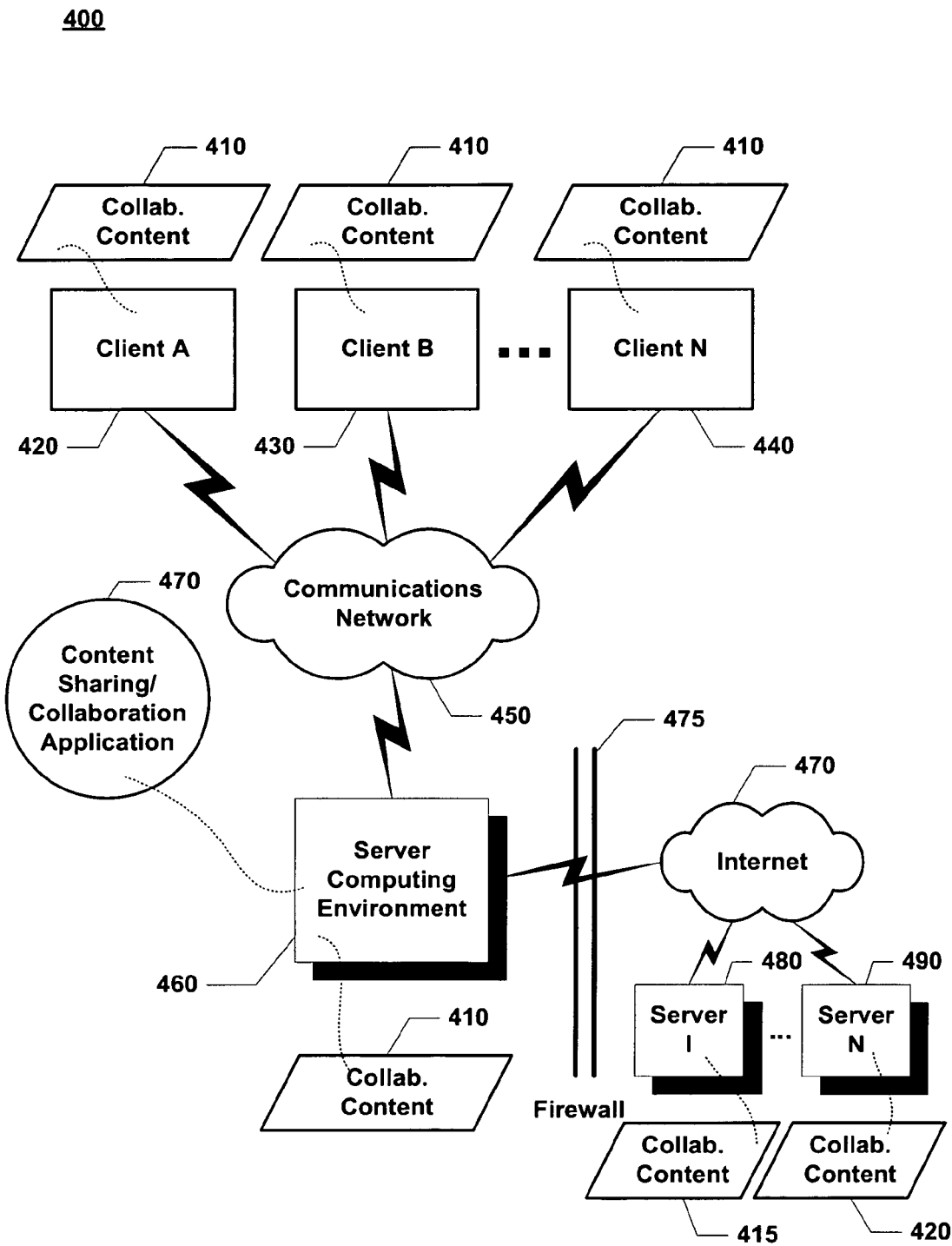
FIG. 4 is a is a block diagram of another illustrative configuration of an exemplary content sharing and collaboration computing environment.

FIG. 4 shows another exemplary content sharing and collaboration computing environment 400. As is shown, in an illustrative implementation, exemplary content sharing and collaboration computing environment 400 can comprise a number of client computing environments (e.g., Client A 420, Client B 430, up to Client N 440) that can operate to process and display delivered collaborative content 410 that can be received from communications network 450. Additionally, in this illustrative implementation, exemplary content sharing and collaboration computing environment can comprise server computing environment 460 that can operate content sharing/collaboration computing application 470 and can operate to process collaborative content 405. Moreover, exemplary content sharing and collaboration computing environment can comprise firewall 475, Internet 470, and one or more other server computing environments (e.g., Server I up to Server N) having other collaborative content 415 and 420.

In an illustrative operation, one or more client computing environments (e.g., Client A 420, Client B 430, up to Client N 440), can communicate a request for a collaborative content session to content sharing/collaboration computing application 470 operating on server computing environment 460 over communications network 450. Responsive to the request for a collaborative content session, content sharing/collaboration computing application 470 can generate a session in which one or more of cooperating client computing environments (e.g., Client A 420, Client B 430, up to Client N 440) can participate in the generated session to share and collaborate content. When generating the session, the content sharing/collaboration application does not cooperate with the one or more participating client computing environments (e.g., Client A 420, Client B 430, up to Client N 440) to load and/or execute any client based computing application. Rather, in the illustrative implementation, content sharing/collaboration computing application 470 can operate to generate a unique identification tag which can be used by one or more cooperating client computing environments (e.g., Client A 420, Client B 430, up to Client N 440) to participate in a collaborative session. When conducting a content sharing/collaboration session, content sharing/collaboration computing application 470 can operate to process collaborative content 405 and communicate processed collaborative content 405 to one or more participating client computing environments over communications network 450. One or more of participating client computing environments (e.g., Client A 420, Client B 430, up to Client N 440) can operate to receive collaborative content 405 as delivered collaborative content 410 for display, manipulation, and navigation.

Moreover, in the illustrative implementation, exemplary content sharing and collaboration computing environment 400 can operate in the context of an enterprise computing environment such that content sharing/collaboration computing application 470 can cooperate with one or more cooperating other server computing environments (e.g., Serer I up to Server N) having other collaborative content 415 and 420 to obtain other collaborative content 415 and 420 to respond to one or more requests for collaborative content from one or more client computing environments (e.g., Client A 420, Client B 430, up to Client N 440) during a collaborative session. In this context, content sharing/collaboration computing environment 470 can operate to communicate with one or more other server computing environments (Server 1 up to Server N) through firewall 475 and Internet. Responsive to a request for other collaborative content 415 and/or 420, one or more other server computing environments (e.g., Server I up to Server N) can communicate other requested collaborative content 415 and/or 420 to content sharing/collaboration computing application 470 over Internet 470 and firewall 475. Once received, content sharing/collaboration computing application 460 can communicate the other received collaborative content 415 and/or 420 to one or more requesting clients (e.g., Client A 420, Client B 430, up to Client N 440) over communications network 450.

It is appreciated that although an exemplary content sharing and collaboration computing environment is shown to have particular components in a selected configuration that such description is merely illustrative as the inventive concepts described herein can be applied to a number content sharing and collaboration computing environments having various components operating in various configurations.

Figure 5:
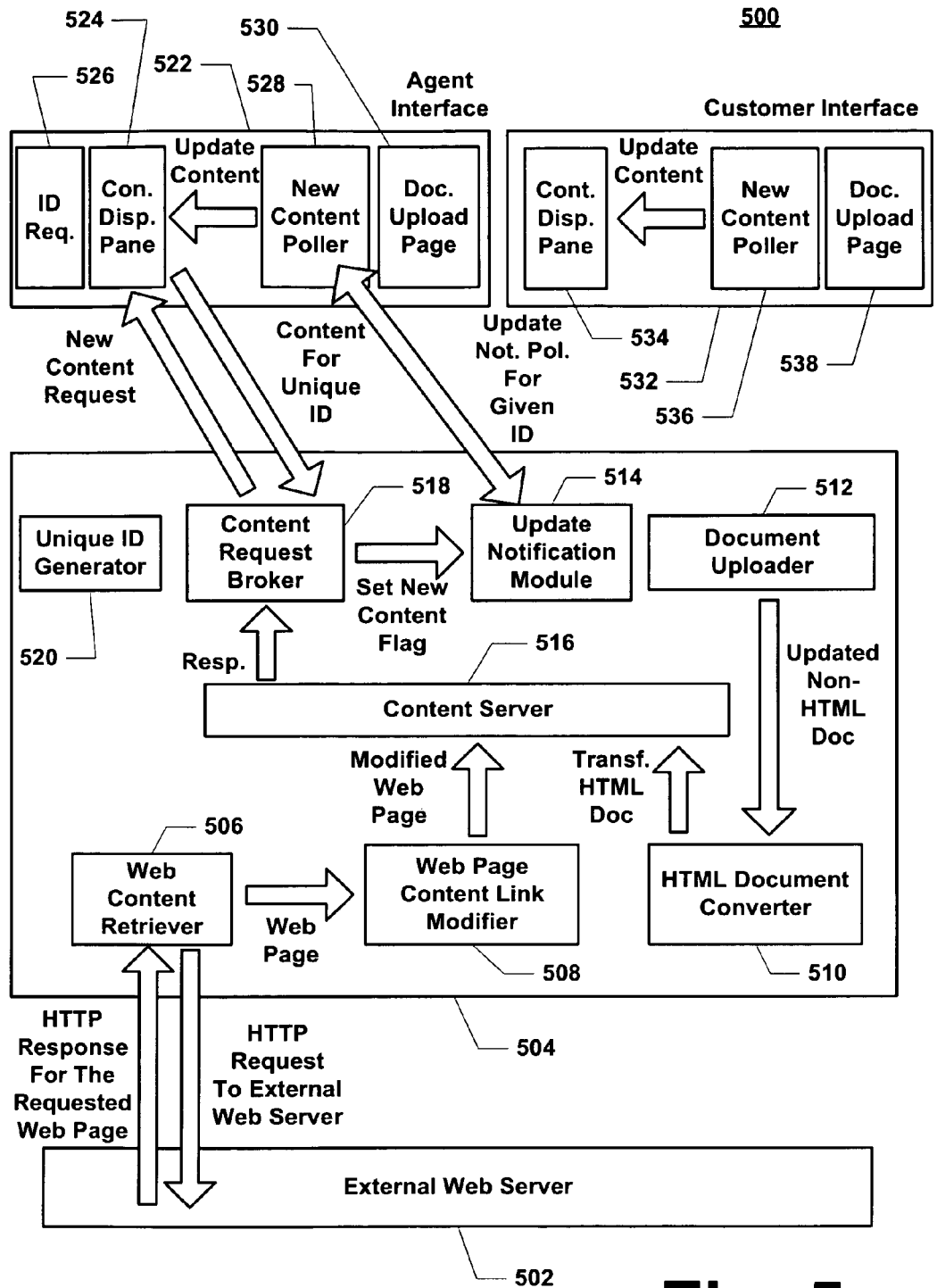
FIG. 5 is a block diagram showing the cooperation of illustrative components when performing content sharing and collaboration.

FIG. 5 shows another illustrative implementation of the interaction of components of exemplary content sharing and/or collaboration computing environment 500 operating in an illustrative deployment wherein a customer service agent shares and collaborates content with a prospective customer over the Internet and using web browser computing applications. As is shown, illustrative content sharing and collaboration computing environment 500 comprises agent interface 522, customer interface 532, server computing environment 504, and external web server 502.

Further, as is shown in FIG. 5, agent interface 522 can comprise ID requestor component 526, content display pane 524, new content poller 528, and content upload page 530. Also, customer interface can further comprise content display pane 534, new content poller 536, and document upload page 538. Additionally, server computing environment can further comprise unique ID generator 520, content request broker 518, update modification module 514, document uploader 512, HTML document converter 510, web page content link modifier 508, web content retriever 506, and content server 516.

In an illustrative operation, an operator (not shown) cooperating with agent interface 522 can request an ID through ID requestor component 526. The ID Requestor 526, responsive to a request for an ID communicates with the unique ID generator 520 of server computing environment 504. Unique ID generator 520 processes the received ID request to determine if the requesting party is authorized to request an ID. If the requesting party (e.g., agent interface) is authorized (e.g., a check of some selected authorization criteria such as login id and password) a unique ID is generated and communicated back to the agent interface. The operator of the agent interface (not shown) can then communicate the generated unique ID to a cooperating customer interface for use when generating a content sharing/collaboration session an agent (not shown) and customer (now shown).

As is shown in FIG. 5, when engaged in a content sharing and/or collaboration session, agent interface 522 can provide to content request broker 518 of server computing environment 504 a pointer for content to be associated with the generated unique ID. Responsive to the receipt of such a content pointer, content request broker 518 can cooperate with update notification module 514 to set a new content flag. Update modification module 514 can, in turn, cooperate with new content poller 528 of agent interface 522 and new content poller 536 of customer interface 532.

Agent interface 522 and customer interface 532 can cooperate in various ways to share and/or collaborate content as part of an established content sharing and/or collaboration session. In an illustrative operation, agent interface 522 can cooperate with customer interface 532 to share and/or collaborate content that resides on content server 516 of server computing environment 504. In this context, agent interface 522 can cooperate with server computing environment 504 to request and retrieve content for sharing and/or collaboration with customer interface 532 as part of an established content sharing and/or collaboration session, established in a manner described previously. Agent interface 522 can place a request for content as part of an established content sharing and/or collaboration session from content server 516 of server computing environment 504. Responsive to the request for content, content server 516 of server computing environment 504 retrieves the requested content for sharing/collaboration and delivers the content to content request broker 518. In turn, content request broker 518 can cooperate with content display pane 524 of agent interface 522 and content display pane 534 of customer interface 532.

In the illustrative implementation, exemplary content sharing and/or collaboration environment 500 can also operate such that content from an external source be retrieved to cooperating interfaces (e.g., agent interface 522 and customer interface 532) for sharing and/or collaboration as part of an established content sharing and/or collaboration session. In such context a content sharing and/or collaboration session is established according to the manner described previously (e.g., obtaining a unique identification (ID)). The requesting interface (e.g., agent interface 522 and/or customer interface 532) can request content from an external content server (e.g., external web server 502) by communicating the request to content request broker 518 of server computing environment 504. Responsive to the request of content from an external content server (e.g., external web server 502), content request broker 518 cooperates with web content retriever 506 to retrieve the requested content from external content server (e.g., external web server 502). As is shown in FIG. 5, web content retriever can provide a request for the requested content (e.g., HTTP request for requested web page) to external web server 502. Responsive to the request for content, external content server (e.g., external web server 502) can provide the requested content to web content retriever 506 (e.g., as a HTTP response for the requested web page). Web content retriever 506, receiving the requested external content server content, in turn, can cooperate with web page content link modifier 508. In an illustrative implementation, web page content link modifier can operate to change the received external content server content (e.g., modify one or more links of the received web page from external web server 502) so that it is in a form that can be processed by content server 516. The modified content, modified by web page link modifier can then be communicated to content server 516 for processing and storage. Content server 516, in turn, cooperates with content request broker 518 to deliver the modified external content server content to the requesting interface (e.g., agent interface 522 and/or customer interface 532) to satisfy the request for content from an external server.

In an illustrative operation, exemplary content sharing and/or collaboration computing environment 500 can operate to allow participating users to upload content to server computer environment 504 for sharing and/or collaboration. In this context, a participating interface (e.g., agent interface 522 and/or customer interface 532) can cooperate through a document upload component (e.g., document upload page 530 of agent interface 522 and document upload page 538 of customer interface 532). A content sharing and/or collaboration session is established according to the manner described previously. As part of the content sharing and/or collaboration session, a participating user can cooperate with participating interface (e.g., agent interface 522 and/or customer interface 532) to upload content for sharing and/or collaboration. The document upload component (e.g., document upload page 530 of agent interface 522 and document upload page 538 of customer interface 532) can cooperate with document uploader 512 of server computing environment 504 to communicate (e.g., upload) content for sharing and/or collaboration in an established content sharing and/or collaboration session. As is shown in FIG. 5, document up-loader 512 can cooperate with document converter (e.g., HTML document converter 510) to convert the communicated content from its native content format (e.g., rich format text) to another content format (e.g., hyper text mark up language) so that is can be processed by content server 516. Once converted by document converter 510 and communicated to content server 516, the content uploaded by the participating interface can be shared and/or collaborated. In this context, a participating interface (e.g., agent interface 522 and/or customer interface 532) can cooperate with content request broker 518 to request the content previously uploaded. Responsive to this request, content broker 518 can cooperate with content server 516 to retrieve the previously uploaded content and communicate it to the requesting participating interface(s).

It is appreciate that although document converter is described in the illustrative implementation and operation as an HTML document converter that such description is merely exemplary as the inventive concepts described herein can apply to various document converters to convert uploaded documents into a file format that can be processed by content server and can be used in a content sharing and/or collaboration session in accordance with the herein described systems and methods.

For the purposes of the illustrative implementation and deployment, a customer service department of a company selling products/services on the World Wide Web (WWW) can employ content sharing/collaboration computing environment 500 to allow its customer service (technical service, sales, marketing personnel, etc.) representatives (e.g., through the use of agent interface 522) to share and/or collaborate content (e.g., a company online catalogue, product description, technical service manual, etc.) with a customer (e.g., using customer interface 532) such that a the company representative and the customer can view, navigate, manipulate, and modify the same content through their respective user interfaces (e.g., representative through the agent interface 524 and customer through the customer interface 532) in real time. The illustrative deployment can allow companies to offer real time collaboration services to their customers such that the company representative and customer can share and collaborate desired content (e.g., product description, technical information, etc.) through their respective user interfaces (e.g., web browsing computing applications).

It is appreciated that although exemplary content and sharing computing environment 500 is described in an illustrative deployment that such description is merely illustrative as the inventive concepts described herein can be applied to numerous deployments to realize the electronic sharing and/or collaboration of content between two or more participating users using various computing applications (e.g., web browser computing applications, word processing computing applications, spreadsheet computing applications, graphic design computing applications, virtual meeting computing applications, etc.) operable to communicate with the illustrative server computing environment.

Figure 6:
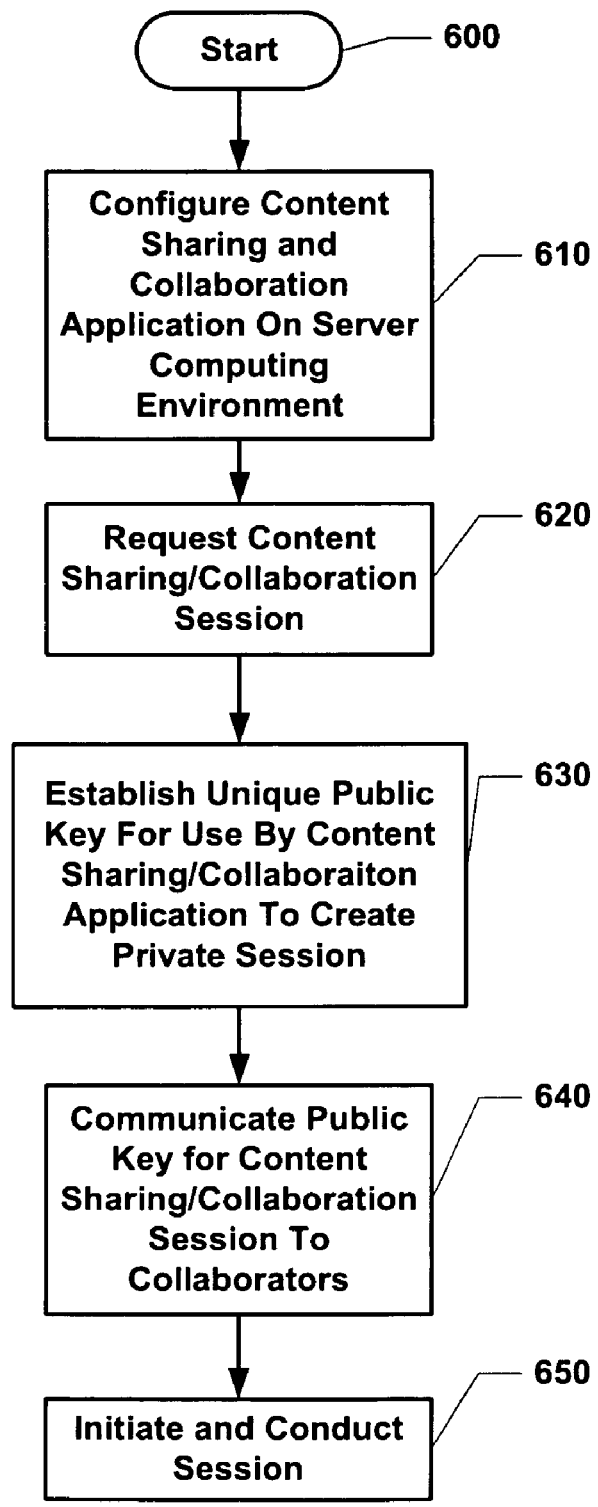
FIG. 6 is a flow diagram of the processing performed when configuring an exemplary content sharing and collaboration computing environment.

FIG. 6 is a flow diagram of the processing performed by an illustrative content sharing and collaboration computing environment when configuring the illustrative content sharing and collaboration computing environment. As is shown, processing begins at block 600 and proceeds to block 610 where the content sharing and collaboration application is configured on the server computing environment. A request for a sharing/collaboration session is then received at block 620. A unique public key is then established at block 630 to create a private session by the content sharing and collaboration application. The key is then communicated to participating users (e.g., session participants) at block 640. The session is then initiated and conducted at block 650.

Figure 7:
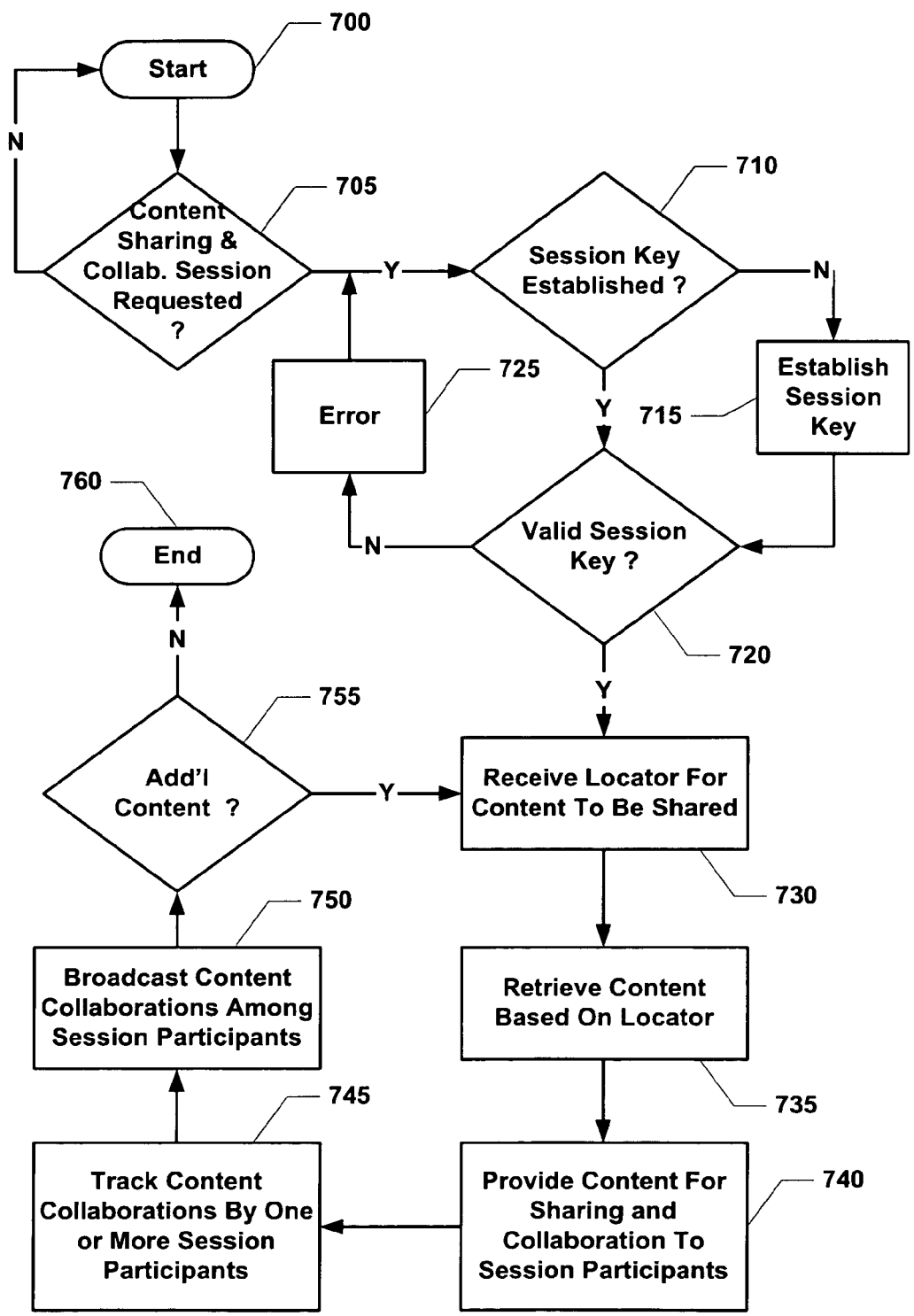
FIG. 7 is a flow diagram of the processing performed when sharing and collaborating content.

FIG. 7 is a flow diagram of the processing performed by an illustrative content sharing and collaboration computing environment when sharing and collaborating content. As is shown, processing begins at block 700 and proceeds to block 705 where a check is performed to determine if a content sharing and collaboration session has been requested. If the check at block 705 indicates that a content sharing and collaboration session has not been requested, processing reverts to block 700 and continues from there. However, if at block 705 the check indicates that a content sharing and collaboration session has been requested processing proceeds to block 710 where a check is performed to determine if a session key has been established. If the check at block 710 indicates that a session key has been established, processing proceeds to block 720 where a check is performed to determine if the session key is valid. If the check at block 720 indicates that the session key is invalid, an error is generated at block 725 and processing proceeds to the input of block 710 and continues from there. Additionally, if the check at block 710 indicates that the session key has not been established, a session key is established at block 715 and processing proceeds to block 720 where it continues.

However, if the check at block 720 indicates that the session key is valid, processing proceeds to block 740 where a locator for the content is received. The content is then retrieves using the received locator at block 735. From there, processing proceeds to block 740 where the content is provided to the session participants for sharing and collaboration. Content collaborations are then tracked at block 745 to determine how the session participants are using (e.g., manipulating, changing, navigating, moving, etc.) the content. The content collaborations are then broadcast to the session participants at block 750. A check is then performed at block 755 to determine if there is additional content that requires sharing and/or collaboration. If the check at block 755 indicates that there is additional content to be shared and/or collaborated, processing reverts back to block 730 and continues from there. However, if the check at block 755 indicates that there is no more content requiring sharing and/or collaboration, processing ends at block 760.

It is understood that the herein described systems and methods are susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computing environments maintaining programmable computers that include a processor, a storage medium readable by the processor (including volatile and non-volatile memory and/or storage elements), at least one input device, and at least one output device. Computing hardware logic cooperating with various instructions sets are applied to data to perform the functions described above and to generate output information. The output information is applied to one or more output devices. Programs used by the exemplary computing hardware may be preferably implemented in various programming languages, including high level procedural or object oriented programming language to communicate with a computer system. Illustratively the herein described apparatus and methods may be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The apparatus may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A computer-implemented process comprising:
  managing a first version of shared collaborative content on a server system including hardware;
  broadcasting first collaborative content based on said first version of said shared collaborative content to users of client systems to yield first delivered collaborative content for each of said client systems through respective web browsers;
  modifying, by users using respective Web browsers, contents of first version of said shared collaborative content to yield updated documents;
  wherein said modifying is performed using said Web browsers but without using plugins for said Web browsers; receiving from one of said client systems a client request to update its first delivered collaborative content; and
  responding to said client request by:
    updating said shared collaborative content to yield a second version of said shared collaborative content, and
    broadcasting second collaborative content based on said second version of said shared collaborative content to said client systems so that each of said client systems receives second delivered collaborative content, said second delivered collaborative content being the same for all of said clients.

2. A process as recited in claim 1 wherein said request is to modify said first delivered collaborative content.

3. A process as recited in claim 1 wherein said request is generated by activating a hyperlink presented in said first delivered collaborative content.

4. A process as recited in claim 1 further comprising translating a document uploaded from one of said client systems into a format manageable by said collaboration application so that content of said document can become part of said shared collaborative content.

5. A process as recited in claim 1 further comprising translating first versions of hyperlinks in a source document into second version of said hyperlinks that point to locations within said shared collaborative content once said source document is included as at least part of said shared collaborative content.

6. A system comprising non-transitory computer-readable storage media encoded with code defining a collaboration application that, when executed by hardware, provides for:
   managing a first version of shared collaborative content on a server system;
   broadcasting first collaborative content based on said first version of said shared collaborative content to users of client systems to yield first delivered collaborative content for each of said client systems through respective web browsers;
   modifying, by users using respective Web browsers, contents of first version of said shared collaborative content to yield updated documents;
   wherein said modifying is performed using said Web browsers but without using plugins for said Web browsers;
   receiving from one of said client systems a client request to update its first delivered collaborative content; and
   responding to said client request by:
      updating said shared collaborative content to yield a second version of said shared collaborative content, and
      broadcasting second collaborative content based on said second version of said shared collaborative content to said client systems so that each of said client systems receives second delivered collaborative content, said second delivered collaborative content being the same for all of said clients.

7. A system as recited in claim 6 further comprising said hardware.

8. A system as recited in claim 6 wherein said request is to modify said first delivered collaborative content.

9. A system as recited in claim 6 where said request is generated by activating a hyperlink presented in said first delivered collaborative content.

10. A system as recited in claim 6 wherein said code further defines a document translator for translating a document uploaded from one of said client systems into a format manageable by said collaboration application so that content of said document can become part of said shared collaborative content.

11. A system as recited in claim 6 wherein said code further defines a document translator for translating a first version of a hyperlink in a source document into second version of said hyperlink that points to a location within said shared collaborative content once said source document is included as at least part of said shared collaborative content.

12. A process as recited in claim 1 wherein said collaborative content includes hypertext markup language (HTML) code.

13. A system as recited in claim 6 wherein said collaborative content includes hypertext markup language (HTML) code.

* * * * *